United States Patent
Moro et al.

(10) Patent No.: US 8,609,057 B2
(45) Date of Patent: Dec. 17, 2013

(54) METHOD FOR SEPARATION OF COMPONENTS FROM A REACTION MIXTURE VIA A CONCENTRATED ACID

(75) Inventors: Lorenza Moro, San Carlos, CA (US); Jordi Perez Mariano, Menlo Park, CA (US); John Vaughn, Pacifica, CA (US); Angel Sanjurjo, San Jose, CA (US)

(73) Assignee: SRI International, Menlo Park, CA (US)

(*) Notice: Subject to any disclaimer, the term of this patent is extended or adjusted under 35 U.S.C. 154(b) by 9 days.

(21) Appl. No.: 12/794,999

(22) Filed: Jun. 7, 2010

(65) Prior Publication Data

US 2011/0300049 A1 Dec. 8, 2011

(51) Int. Cl.
*C01B 33/02* (2006.01)
*C22B 61/00* (2006.01)

(52) U.S. Cl.
USPC .............. 423/348; 423/202; 423/349; 75/392

(58) Field of Classification Search
USPC ............. 423/69, 82, 111, 131, 132, 276, 298, 423/324, 348–350, 1, 184, 202; 75/392–399
See application file for complete search history.

(56) References Cited

U.S. PATENT DOCUMENTS

| | | | |
|---|---|---|---|
| 2,172,969 A | | 9/1939 | Eringer |
| 3,180,703 A | * | 4/1965 | Ableson et al. .................... 423/7 |
| 3,658,510 A | * | 4/1972 | Hoffmann et al. .............. 75/371 |
| 4,442,082 A | | 4/1984 | Sanjurjo |
| 4,584,181 A | | 4/1986 | Nanis |
| 4,590,043 A | | 5/1986 | Sanjurjo |
| 4,655,827 A | | 4/1987 | Sanjurjo |
| 4,777,030 A | | 10/1988 | Sancier |
| 2009/0263307 A1 | * | 10/2009 | Nanis et al. ................... 423/350 |

OTHER PUBLICATIONS

Sanjurjo et al, "Silicon by Sodium Reduction of Silicon Tetrafluoride", Jan. 1981, J. Electrochem. Soc.: Solid-State Science and Technology, vol. 128, No. 1, pp. 179-183.*
Felder and Rousseau, "Elementary Principles of Chemical Processes," 2005, Third Edition, p. 110.*
International Search Report for PCT/US2011/039309, Mar. 10, 2011.*
International Search Report and Written Opinion for PCT/US2011/039309, Oct. 3, 2011, copy consists of 10 pages.

* cited by examiner

*Primary Examiner* — Steven Bos
*Assistant Examiner* — Justin Bova

(57) ABSTRACT

In one embodiment, the present disclosure relates generally to a method for recovering an element from a mixture of the element with an ionic halide. In one embodiment, the method includes treating the mixture of the element and the ionic halide with an acidic solution to dissolve the ionic halide, wherein the acidic solution comprises water and an acid and has a pH of less than 1.0 and removing the element from an aqueous solution that results after the treating step.

10 Claims, 6 Drawing Sheets

METHOD FOR SEPARATION OF COMPONENTS FROM A REACTION MIXTURE VIA A CONCENTRATED ACID

BACKGROUND

Some processes for producing elements such as semiconductors, metals and metalloids generate mixtures of the element and an ionic halide. The element and the ionic halide in such mixtures must then be separated.

In one embodiment, the element and the ionic halide can be separated by a leaching process. However previous leaching processes have many drawbacks. For example, some of the previous leaching processes require an additional separation step between the element and a solid by-product. In addition, the by-products created from the previous leaching processes are generally difficult to dispose of or to recycle.

SUMMARY

In one embodiment, the present disclosure relates generally to a method for recovering an element from a mixture of the element with an ionic halide. In one embodiment, the method includes treating the mixture of the element and the ionic halide with an acidic solution to dissolve the ionic halide, wherein the acidic solution comprises water and an acid and has a pH of less than 1.0 and removing the element from an aqueous solution that results after the treating step.

In one embodiment, the present disclosure is directed towards a method for recovering silicon (Si) from a mixture of Si and sodium fluoride (NaF). The method comprises treating the mixture of the Si and the NaF with an acidic solution to dissolve the NaF, wherein the acidic solution comprises water and an acid and has a pH of less than 1.0 and removing the Si from an aqueous solution that results after the treating step.

In one embodiment, the present disclosure is directed towards a method for recovering an element from a mixture of the element with an ionic halide. The method comprises producing the mixture of the element and the ionic halide during reduction of a precursor halide formed from a complex precursor salt used to produce the element, treating the mixture of the element and the ionic halide with an acidic solution to dissolve the ionic halide, wherein the acidic solution comprises water and an acid and has a pH of less than 1.0 and removing the element from an aqueous solution that results after the treating step.

BRIEF DESCRIPTION OF THE DRAWINGS

So that the manner in which the above recited features of the present disclosure can be understood in detail, a more particular description of the disclosure may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

A brief discussion of a process of producing high purity silicon from fluorosilicic acid will aid the reader on understanding a useful application of one embodiment of the present invention. An overall process 100 illustrated in FIG. 1 consists of three major operations which encompass a series of steps. The first major operation includes the step of precipitation of a complex precursor salt, such as for example sodium fluorosilicate ($Na_2SiF_6$), from fluorosilicic acid ($H_2SiF_6$) and a salt, such as for example sodium fluoride (NaF) or sodium chloride (NaCl), followed by generation of a precursor halide, such as for example silicon tetrafluoride gas ($SiF_4$) by thermal decomposition, illustrated as a block of steps 110 in FIG. 1. The precipitation of sodium fluorosilicate from fluorosilicic acid comprises a reaction equation as shown below by Eq. (1) and in sub-step 112 of FIG. 1.

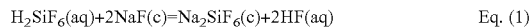
$$H_2SiF_6(aq)+2NaF(c)=Na_2SiF_6(c)+2HF(aq) \quad \text{Eq. (1)}$$

The sodium fluorosilicate is filter dried in sub-step 114. Since the impurities with higher solubility than $Na_2SiF_6$ remain preferentially in the aqueous solution, the precipitation and filtration of $Na_2SiF_6$ results in a purification step beneficial towards the production of high purity silicon. Subsequently, the sodium fluorosilicate is thermally decomposed in step 116 with heat. In one embodiment, the sodium fluorosilicate may be heated up to temperatures in the range of 600 degrees Celsius (° C.) to 1000° C. The reaction equation for the thermal decomposition of sodium fluorosilicate is shown below by Eq. (2) and in sub-step 116 of FIG. 1.

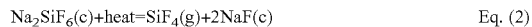
$$Na_2SiF_6(c)+heat=SiF_4(g)+2NaF(c) \quad \text{Eq. (2)}$$

The second major operation comprises the reduction of the precursor halide, such as for example silicon tetrafluoride ($SiF_4$) gas, to an elemental material, such as for example silicon (Si), and an ionic halide, such as for example sodium fluoride (NaF). In one embodiment, the $SiF_4$ is reduced by sodium metal (Na) as illustrated by a block of steps 120 in FIG. 1. The reduction of the silicon tetrafluoride gas to silicon is shown below by Eq. (3) and in sub-step 122 of FIG. 1.

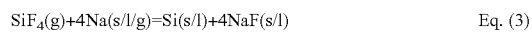
$$SiF_4(g)+4Na(s/l/g)=Si(s/l)+4NaF(s/l) \quad \text{Eq. (3)}$$

Figure 1:
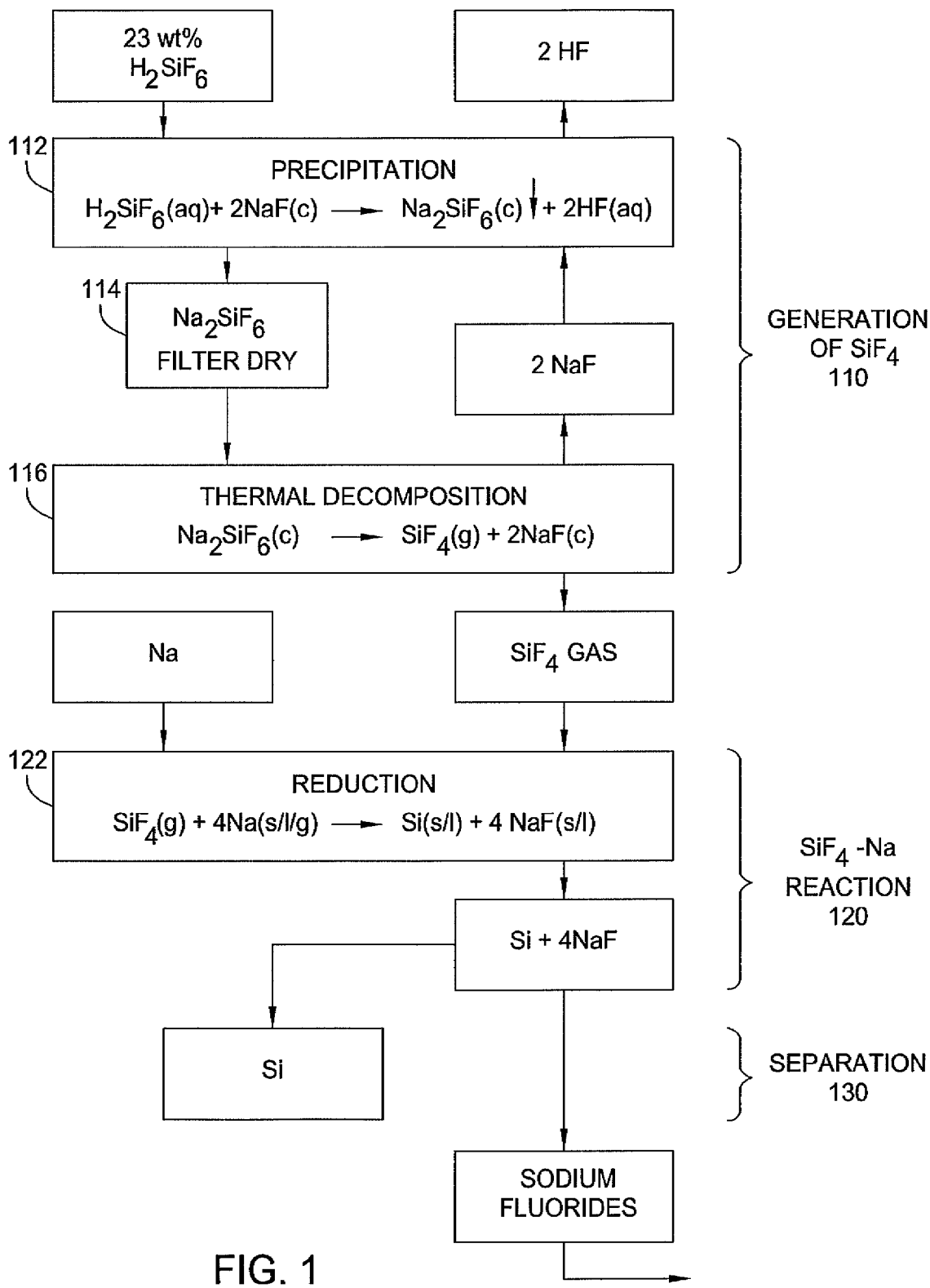
FIG. 1 depicts a flow diagram of one example of a process for producing high purity silicon by a process that may utilize the present invention.

The third major operation involves the separation of the produced elemental material, such as silicon (Si), from the mixture of the element and the ionic halide, such as sodium fluoride (NaF), as shown in a block of steps 130 in FIG. 1. Further details of each of the above identified operations are disclosed in U.S. Pat. Nos. 4,442,082, 4,584,181 and 4,590,043, which are hereby incorporated by reference. Moreover, the above steps are merely provided as an example and are not to be considered limiting. In addition, although the above process is illustrated for the production of pure silicon, the process may be applied to other elemental materials such as boron (B), aluminum (Al), titanium (Ti), vanadium (V), zirconium (Zr), niobium (Nb), molybdenum (Mo), tungsten (W), tantalum (Ta), uranium (U) or plutonium (Pu).

Previously, one way to separate the Si from the NaF in step 130 was by a leaching process. Examples of the previous leaching processes are described in U.S. Pat. Nos. 4,655,827 and 4,777,030. In these processes, NaF is dissolved using aqueous solutions and Si is separated as a solid after drying. The pH of the aqueous solutions is adjusted to a value ranging between 1 to 7 by adding a selected acid.

The purpose of the acid solution in the previous processes was to neutralize any unreacted sodium and to decrease spontaneous oxidation of silicon that occurs in alkaline solutions. In addition, an alkaline earth metal chloride was added to the leaching solution that induced precipitation of the corresponding alkaline earth metal fluoride and, therefore, expedited dissolution of NaF and reduced leaching steps. However, in this process the recovered Si was mixed with the solid alkaline earth fluoride and needed to be separated.

The methods described in the present disclosure have multiple unexpected advantages over previously used methods. For example, the methods described in the present disclosure require significantly reduced amounts of water for the leaching process. In addition, the element is removed as a solid from the aqueous solution and does not require additional separation processing. Finally, a by-product of the methods described herein are more easily recycled or disposed of without causing environmental harm.

Figure 2:
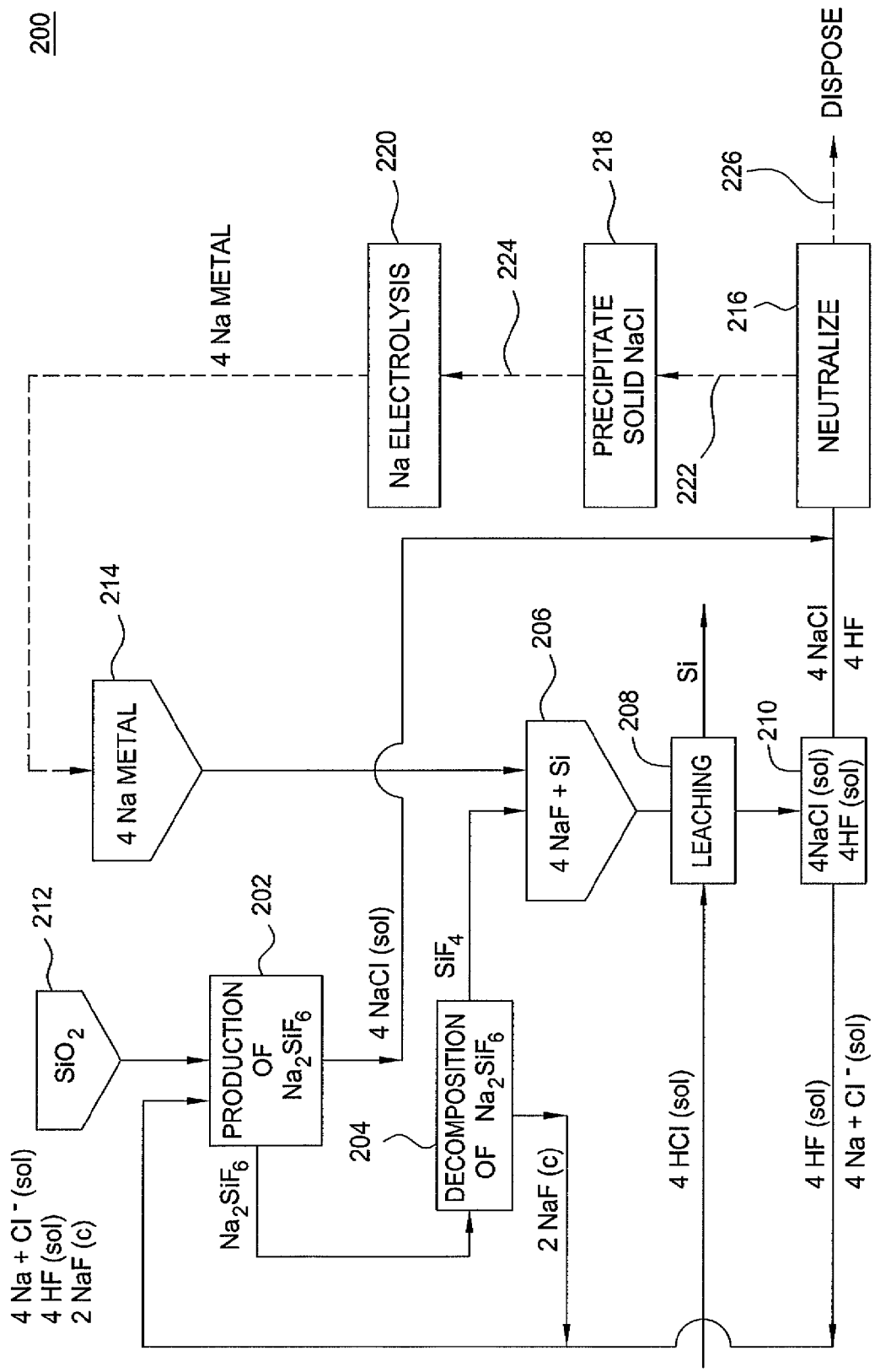
FIG. 2 depicts one embodiment of a process flow diagram for recovering an element from a mixture of the element with an ionic halide.

FIG. 2 illustrates one embodiment of a process flow diagram illustrating a process 200 for recovering an element from a mixture of the element with an ionic halide. The method 200 may be used to recover various elements such as semiconductors, metals and metalloids. For example, the elements include boron (B), aluminum (Al), silicon (Si), titanium (Ti), vanadium (V), zirconium (Zr), niobium (Nb), molybdenum (Mo), tantalum (Ta) tungsten (W), uranium (U) or plutonium (Pu). However, method 200 illustrates one embodiment using Si as an example. It should be noted that the compounds used in FIG. 2 can be modified to recover any of the elements noted above.

In one embodiment, with reference to FIG. 1, $Na_2SiF_6$ can be used as a starting material to produce pure Si. The $Na_2SiF_6$ may also be referred to as a complex precursor salt that is used to produce the desired element, e.g., Si. In block 202, $Na_2SiF_6$ is produced and fed to block 204. In block 204, the $Na_2SiF_6$ is thermally decomposed to form $SiF_4$ and NaF. The NaF can be recycled back into block 202 and reacted with silicon dioxide ($SiO_2$) from block 212 and other materials, discussed below, to produce more $Na_2SiF_6$.

The $SiF_4$ may also be referred to as a precursor halide. The $SiF_4$ is then sent to block 206 to be reduced with Na metal from block 214. As illustrated in block 206, the reduction of $SiF_4$ with Na metal produces NaF and Si. One method of removing the Si is via a leaching process. As discussed above, the currently used leaching processes have several drawbacks.

The present disclosure provides a novel leaching process that removes the Si without the need for additional separation steps to remove Si from a solid mixture (e.g., a solid mixture of Si and NaF) and uses a significantly lower amount of water. In one embodiment, a highly concentrated acid is added to the NaF and Si in block 208.

In one embodiment, the acid that is used must have a pKa that is lower than the pKa of a conjugated acid of the ionic halide. For example, using the ionic halide NaF in FIG. 2, the conjugated acid would be hydrofluoric acid (HF). Thus, any acid may be used that has a pKa that is lower than the pKa of HF.

In one embodiment, the acid should be highly concentrated. The acid is mixed with water to form an acidic solution that has a pH less than 1.0. In one embodiment, the pH of the acidic solution is less than 0.5. Highly concentrated may be defined as a concentration of an acid comprising 1 equivalent per liter (eq/L) to 15 eq/L. In one embodiment, highly concentrated may be defined as a concentration of an acid comprising 1 eq/L to 5 eq/L.

As noted above, many different types of acids may be used for the process described herein. In one embodiment, the acid may be at least one of: hydrochloric acid (HCl) or sulfuric acid ($H_2SO_4$), nitric acid ($HNO_3$), perchloric acid ($HClO_4$), hydroiodic acid (HI) or hydrobromic acid (HBr).

At these high concentrations, the function of the acid is not only to neutralize residual elements or compounds in the reaction mixture, such as Na, but also to increase the solubility of the ionic halide and decrease, therefore, the amount of leaching solution, e.g., water, that is needed. In an example, where the ionic halide is NaF, an explanation for this phenomenon is based on the following chemical equilibriums:

$$NaF(s) \leftrightarrow Na^+(aq) + F^-(aq) \qquad \text{Eq. (4)}$$

$$HF(aq) \leftrightarrow H^+(aq) + F^-(aq) \qquad \text{Eq. (5)}$$

HF is a weaker acid than other typical mineral acids. By adding a stronger acid to an aqueous solution containing fluoride ions, the equilibrium in Eq. (5) is shifted towards the non-dissociated form (HF) and fluoride ions are removed from the solution. As a consequence, the equilibrium in Eq. (4) is shifted to the right and more NaF is dissolved. Under such conditions, significantly less volume of leaching solution is needed to dissolve all the NaF.

An extra benefit of separating a reaction mixture of Si and NaF by leaching with high concentration acid aqueous solutions is that according to the equilibrium in Eq. (5) the final aqueous solution contains significant amounts of hydrofluoric acid. This solution can be reacted with a $SiO_2$ source to regenerate the complex precursor salt $Na_2SiF_6$, as described further below.

After the leaching process in block 208, pure Si can be removed. In addition, by-products such as NaCl solution and HF solution are removed at block 210. In one embodiment, the HF and the $Na^+$ and $Cl^-$ ions in solution may be recycled back into block 202 to form the complex precursor salt.

In another embodiment, the NaCl solution may be removed and either disposed of or recycled. First, the NaCl solution is neutralized at block 216. Then, in one option illustrated by path 222, the NaCl solution may be processed to precipitate out solid NaCl at block 218. The solid NaCl follows path 224 where Na electrolysis may be performed in block 220 to separate the Na metal. For example, the NaCl may be fed through a Castner cell. The Na metal is then recycled to block 214, where it is used as a Na metal supply for the precursor halide reduction.

In a second option illustrated by path 226, the NaCl may be disposed of after it is neutralized in block 216. In prior processes a large by-product of the production of pure silicon was NaF. However, NaF has a limited commercial demand. Alternatively, NaF is difficult to dispose of if not reused commercially. In stark contrast, NaCl has a greater commercial demand and can also be disposed of rather easily without environmental harm.

As discussed above, the above process 200 can be used to obtain various elements and ionic halides. For example, the ionic halide may be any alkali metal halide, an alkali earth metal halide, Al halides or Zn halides. It is also preferable that the compound produced by combination of the conjugated anion of the acid with the alkali metal or alkali earth metal cation is highly soluble in water so there is no precipitation of solids that need to be later separated from the element. Using the example of elements used in process 200 described above, the conjugated anion of the acid is the chloride ion (Cl⁻), the alkali metal cation is the sodium cation (Na⁺) and the compound produced is, therefore, sodium chloride (NaCl).

Figure 3:
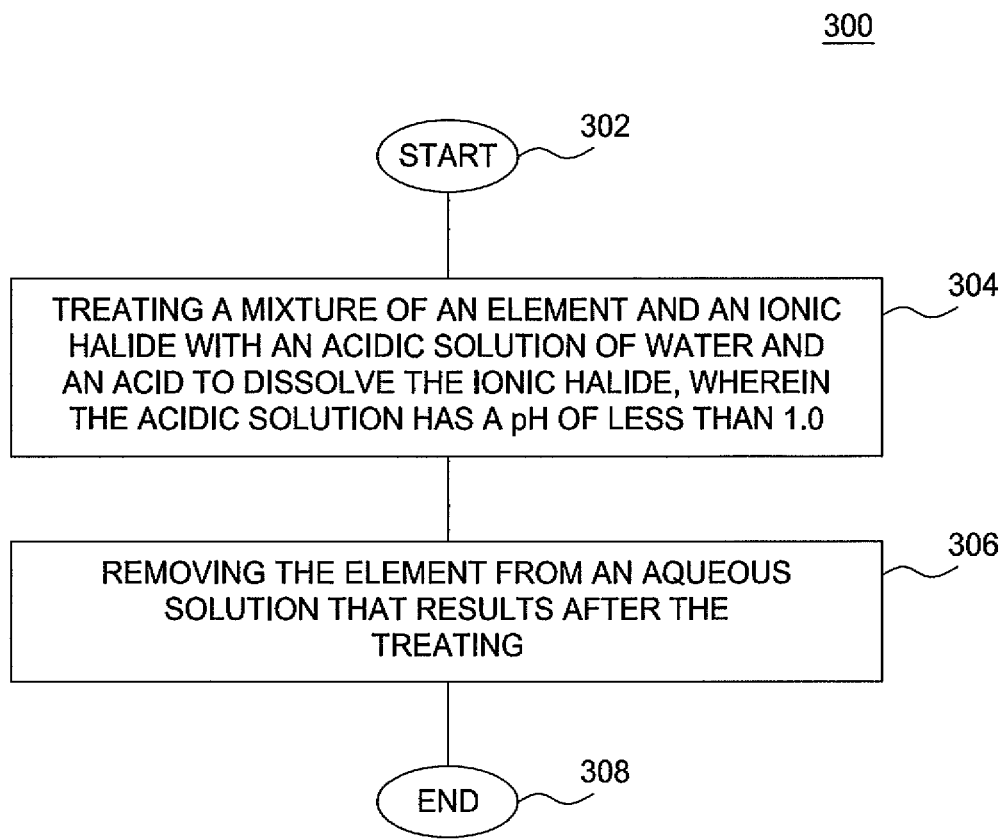
FIG. 3 depicts a flow diagram of one embodiment of a method for recovering an element from a mixture of the element with an ionic halide.

FIG. 3 illustrates a flow diagram of one embodiment of a method 300 for recovering an element from a mixture of the element with an ionic halide. In one embodiment, the method 300 may be carried out in the process 200 illustrated in FIG. 2.

The method 300 begins at step 302. At step 304, the method 300 treats the mixture of the element and the ionic halide with an acidic solution of water and an acid to dissolve the ionic halide. In one embodiment, the acidic solution has a pH of less than 1.0. In another embodiment, the acidic solution has a pH of less than 0.5.

In one embodiment, the element may be at least one of boron (B), aluminum (Al), silicon (Si), titanium (Ti), vanadium (V), zirconium (Zr), niobium (Nb), molybdenum (Mo), tantalum (Ta) tungsten (W), uranium (U) or plutonium (Pu). The ionic halide may be at least one of alkali metal halide, an alkali earth metal halide, Al halides or Zn halides. In another embodiment, the ionic halide may be at least one of alkali metal fluoride, an alkali earth metal fluoride, a fluoride of Al or a fluoride of Zn.

As discussed above, the acid is a highly concentrated acid. For example, the acid has a concentration of between 1 eq/L to 15 eq/L. In another embodiment, the acid has a concentration between 1 eq/L to 5 eq/L. Any acid may be used that has a pKa less than a pKa of a conjugated acid of the ionic halide. For example, the acid may be at least one of hydrochloric acid (HCl) or sulfuric acid ($H_2SO_4$), nitric acid ($HNO_3$), perchloric acid ($HClO_4$), hydroiodic acid (HI) or hydrobromic acid (HBr).

At step 306, the method 300 removes the element from an aqueous solution that results after the treating step. In one embodiment, the element is removed as a solid. No further separation steps are required to remove the element from a solid mixture with other solid compounds (e.g., Si and NaF) as the highly concentrated acid dissolves substantially all of the ionic halide and a minimal amount to no amount of precipitation of solid compounds is formed. At step 308, the method 300 ends.

Figure 4:
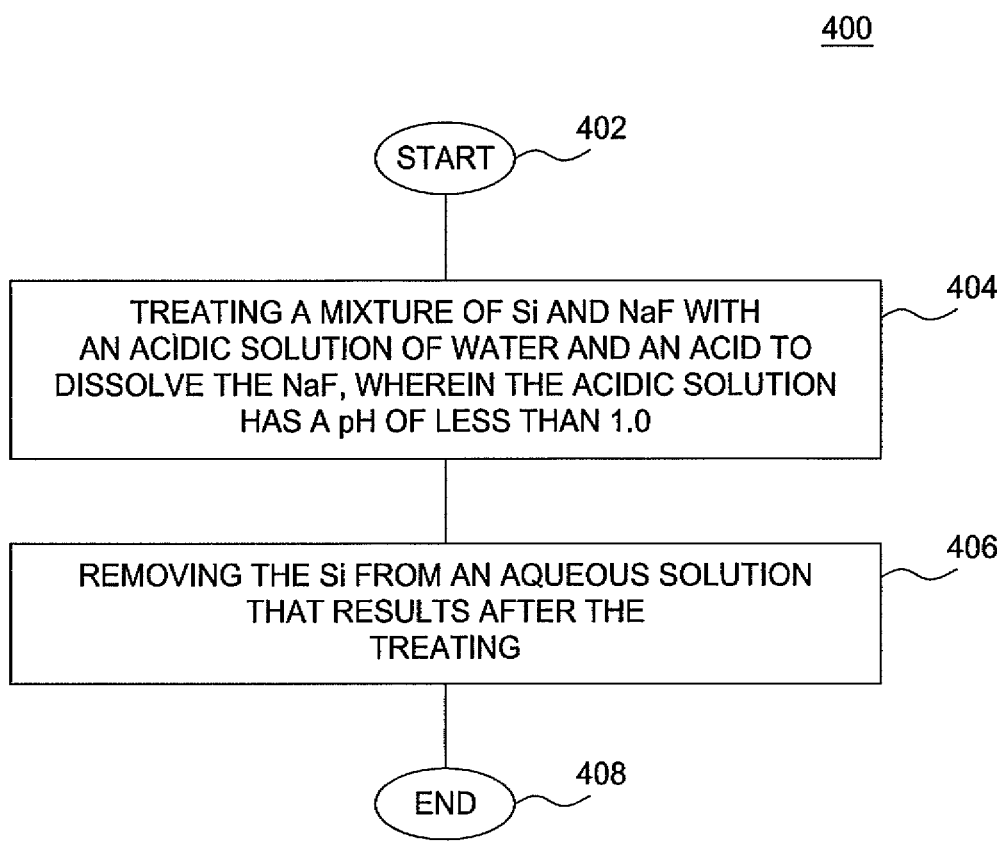
FIG. 4 depicts a flow diagram of a second embodiment of a method for recovering an element from a mixture of the element with an ionic halide.

FIG. 4 illustrates a flow diagram of one embodiment of a method 400 for recovering silicon (Si) from a mixture of Si and sodium fluoride (NaF). In one embodiment, the method 400 may be carried out in the process 200 illustrated in FIG. 2.

The method 400 begins at step 402. At step 404, the method 400 treats a mixture of Si and NaF with an acidic solution of water and an acid to dissolve the NaF. In one embodiment, the acidic solution has a pH of less than 1.0. In another embodiment, the acidic solution has a pH of less than 0.5.

As discussed above, the acid is a highly concentrated acid. For example, the acid has a concentration of between 1 eq/L to 15 eq/L. In another embodiment, the acid has a concentration between 1 eq/L to 5 eq/L. Any acid may be used that has a pKa less than a pKa of a conjugated acid of the ionic halide. For example, the acid may be at least one of hydrochloric acid (HCl) or sulfuric acid ($H_2SO_4$), nitric acid ($HNO_3$), perchloric acid ($HClO_4$), hydroiodic acid (HI) or hydrobromic acid (HBr).

At step 406, the method 400 removes the Si from an aqueous solution that results after the treating step. In one embodiment, the Si is removed as a solid. In addition, the Si does not need to be separated from other solids as no precipitation of solids is formed using the processes described herein. The method 400 ends at step 408.

Figure 5:
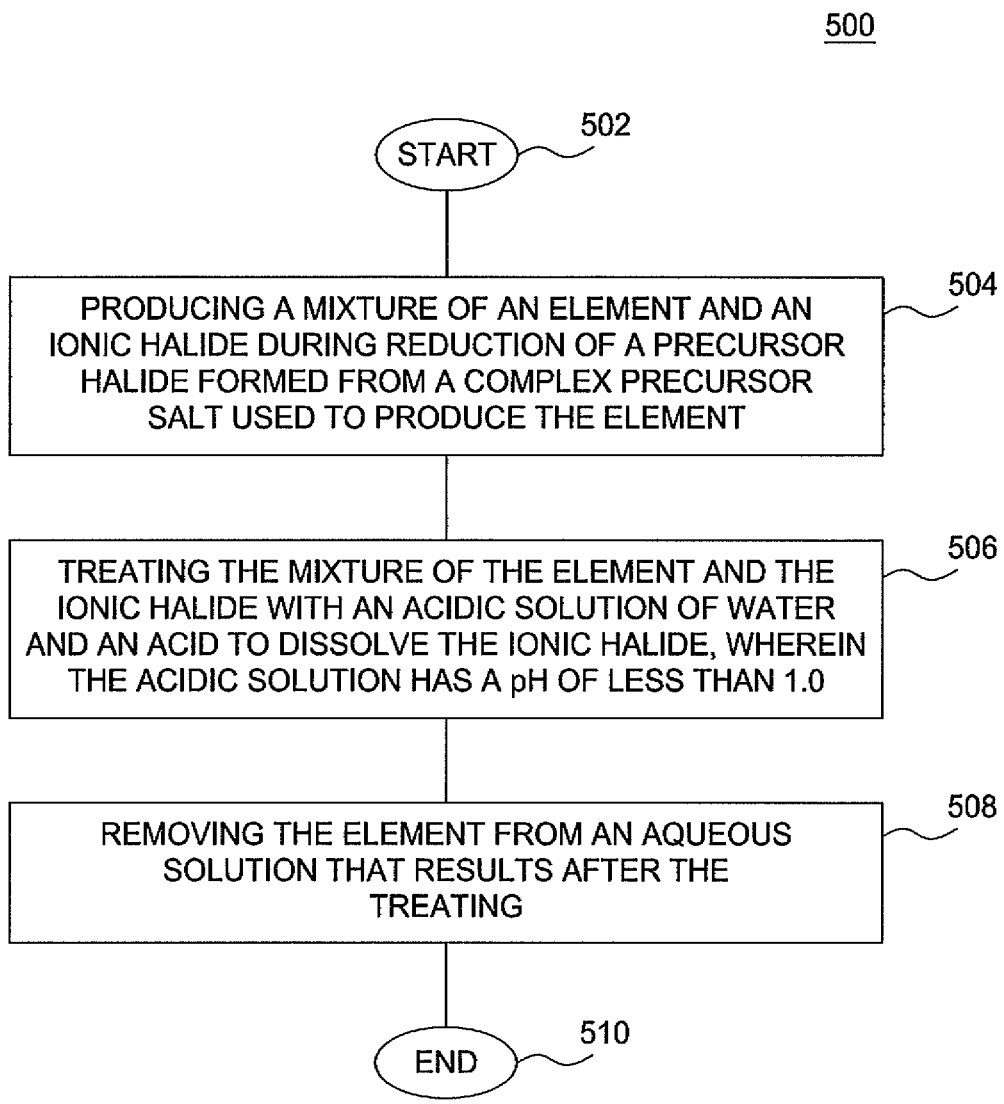
FIG. 5 depicts a flow diagram of a third embodiment of a method for recovering an element from a mixture of the element with an ionic halide.

FIG. 5 illustrates a flow diagram of one embodiment of a method 500 for recovering an element from a mixture of the element with an ionic halide. In one embodiment, the method 500 may be carried out in the process 200 illustrated in FIG. 2.

The method 500 begins at step 502. At step 504, the method 500 produces the mixture of the element and the ionic halide during reduction of a precursor halide formed from a complex precursor salt used to produce the element. In one embodiment, during the production of Si, the precursor halide may be $SiF_4$ gas and the complex precursor salt may be $Na_2SiF_6$.

At step 506, the method 500 treats the mixture of the element and the ionic halide with an acidic solution of water and an acid to dissolve the ionic halide. In one embodiment, the acidic solution has a pH of less than 1.0. In another embodiment, the acidic solution has a pH of less than 0.5.

In one embodiment, the element may be at least one of boron (B), aluminum (Al), silicon (Si), titanium (Ti), vanadium (V), zirconium (Zr), niobium (Nb), molybdenum (Mo), tantalum (Ta) tungsten (W), uranium (U) or plutonium (Pu). The ionic halide may be at least one of alkali metal halide, an alkali earth metal halide, Al halides or Zn halides. In another embodiment, the ionic halide may be at least one of alkali metal fluoride, an alkali earth metal fluoride, a fluoride of Al or a fluoride of Zn.

As discussed above, the acid is a highly concentrated acid. For example, the acid has a concentration of between 1 eq/L to 15 eq/L. In another embodiment, the acid has a concentration between 1 eq/L to 5 eq/L. Any acid may be used that has a pKa less than a pKa of a conjugated acid of the ionic halide. For example, the acid may be at least one of hydrochloric acid (HCl) or sulfuric acid ($H_2SO_4$), nitric acid ($HNO_3$), perchloric acid ($HClO_4$), hydroiodic acid (HI) or hydrobromic acid (HBr).

At step 508, the method 500 removes the element from an aqueous solution that results after the treating step. In one embodiment, the element is removed as a solid. No further separation steps are required as the highly concentrated acid dissolves substantially all of the ionic halide and a minimal amount to no amount of precipitation of solid compounds is formed.

In one embodiment, a conjugated acid of the ionic halide may be reutilized for production of the element. In addition, in one embodiment, the aqueous solution may include a conjugated anion of the acid and an alkali metal or alkali earth metal cation. The conjugated anion of the acid and the alkali metal or alkali earth metal cation may be reutilized for production of the element, recycled to obtain the alkali metal or alkali earth metal via electrolysis or may be neutralized and disposed of. At step 510, the method 500 ends.

EXAMPLE 1

The solubility of NaF in several HCl and $H_2SO_4$ aqueous solutions was determined in several experiments. In each of the experiments, NaF was added in small loads (approximately 0.1 grams (g)) to several HCl and $H_2SO_4$ aqueous solutions, waiting for total dissolution before each addition. Total dissolution was visually assessed. The solubility limit was established as the largest amount of NaF that could be fully dissolved. It was found that the amount of NaF dissolved in these solutions increased with acid concentration for both HCl and $H_2SO_4$ solutions as follows: 78 grams/liter (g/L) when leaching with 2 molar (M) HCl solution, 148 g/L for HCl 4.2 M, 42 g/L for 0.05M $H_2SO_4$, 76 g/L for $H_2SO_4$ 1.1M, 120 g/L for $H_2SO_4$ 2.3 M and 142 g/L for $H_2SO_4$ 7.1M. The upper limit of HCl concentration for practical purposes is around 4M because at this point we observed the precipitation of NaCl. No sodium sulfate precipitation was observed in the explored $H_2SO_4$ concentrations (up to 7.1M). According to these values, approximately 3.5 times more NaF can be dissolved in a 4.2M HCl aqueous solution than in the acidic solutions used in the prior art (i.e. those solutions with a pH of 1 or higher).

EXAMPLE 2

Figure 6:
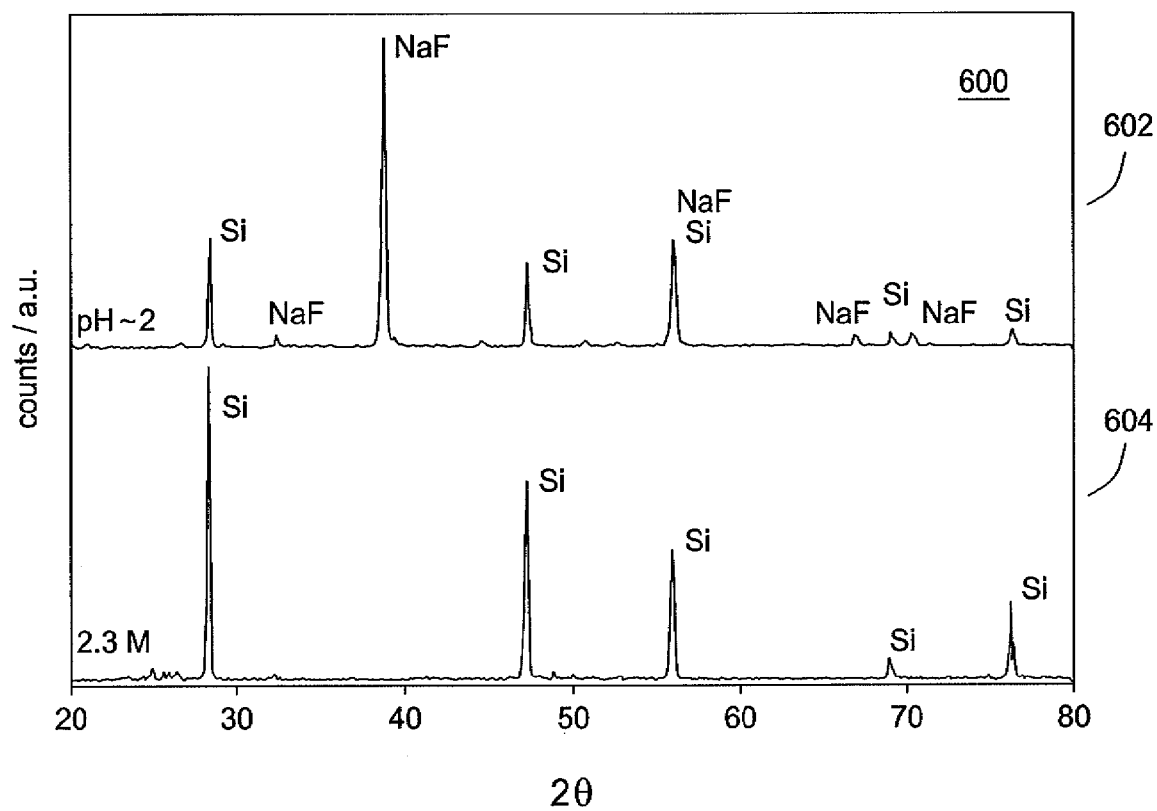
FIG. 6 depicts XRD diffraction patterns of solids obtained after separating, in one embodiment, silicon from sodium fluoride using two aqueous solutions with two different concentrations of acid.

The separation of Si from a reaction product composed of Si—NaF was carried out using the leaching process described above and two different aqueous solutions. A sample from a reaction product produced by reacting $SiF_4$ with Na, as described above in process 100, was crushed to particle size of 1 millimeter (mm) and smaller. Two samples of 50 g were taken from the crushed reaction product. The first sample was added to 0.5 L of 0.05M $H_2SO_4$ aqueous solution and the pH was adjusted to approximately 2, as measured with pH indicator paper. Approximately 10 milliliters (mL) of concentrated $H_2SO_4$ were needed. The second sample was added to 0.5 L of 2.3M $H_2SO_4$ aqueous solution and no further pH adjustment was done. Both mixtures were stirred for 6 hours in plastic containers and after this period the liquid was removed by filtration. The weights of each dry residue were: 27.6 g for the experiment at pH ~2, and 9.2 g for the experiment with 2.3 M solution. FIG. 6 shows the XRD diffraction patterns of both solids. These measurements revealed that the solid from the pH ~2 experiment contains Si and a considerable amount of NaF in XRD pattern 602. The solid from the 2.3M experiment is composed mainly of Si in the XRD pattern 604. These experiments show that using leaching solutions with higher acid content, a larger amount of NaF from a reaction mixture can be dissolved using the same volume of solution. In other words, a smaller amount of leaching solution is needed to separate the element (e.g., Si) from a reaction mixture composed mainly of the element and the ionic halide.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for recovering silicon (Si) from a mixture of Si and sodium fluoride (NaF), the method comprising:
    treating 50 grams (g) of the Si and NaF crushed to a particle size of 1 millimeter (mm) and smaller with a volume of sulfuric acid ($H_2SO_4$) solution having a molarity (M) up to 7.1 M to dissolve the NaF and form a solution containing hydrofluoric acid (HF), wherein the $H_2SO_4$ solution has a pH of less than 0.5,; and
    removing the Si from an aqueous solution that results after the treating.

2. The method of claim 1, wherein the Si is removed as a solid.

3. The method of claim 1, wherein the $H_2SO_4$ has a pKa less than a pKa of the HF.

4. The method of claim 1, wherein the solution containing the HF is reutilized for production of the Si.

5. A method for recovering silicon (Si) from a mixture of Si and sodium fluoride (NaF), the method comprising:
    treating the mixture of the Si and the NaF crushed to a particle size of 1 millimeter (mm) and smaller with a volume of hydrochloric acid (HCl) solution having a molarity (M) up to 4 M and a pH less than 0.5 to dissolve the NaF; and
    removing the Si from an aqueous solution that results after the treating.

6. The method of claim 5, wherein the Si is removed as a solid.

7. A method for recovering silicon (Si) from a mixture of Si and sodium fluoride (NaF), the method comprising:
    producing the mixture of the Si and sodium fluoride (NaF) during a reduction of a silicon tetrafluoride gas ($SiF_4$) formed from a sodium fluorosilicate ($Na_2SiF_6$) used to produce the Si;
    treating 50 grams (g) of the mixture of the Si and NaF crushed to a particle size of 1 millimeter (mm) and smaller with a volume of sulfuric acid ($H_2SO_4$) solution having a molarity (M) up to 7.1 M to dissolve the NaF, wherein the $H_2SO_4$ solution has a pH of less than 0.5; and
    removing the Si from an aqueous solution that results after the treating.

8. The method of claim 1, wherein the volume of $H_2SO_4$ is 0.5 liters (L) of 2.3 M $H_2SO_4$.

9. The method of claim 5, wherein the HCl comprises 2 M HCl.

10. The method of claim 7, wherein the volume of $H_2SO_4$ is 0.5 liters (L) of 2.3 M $H_2SO_4$.

* * * * *